United States Patent
Rehn

(10) Patent No.: US 7,352,119 B2
(45) Date of Patent: Apr. 1, 2008

(54) METHOD FOR DESIGNING A DISCHARGE LAMP

(75) Inventor: Henning Rehn, Berlin (DE)

(73) Assignee: Patent-Treuhand-Gesellschaft für elektrische Glühlampen mbH, Munich (DE)

( * ) Notice: Subject to any disclaimer, the term of this patent is extended or adjusted under 35 U.S.C. 154(b) by 140 days.

(21) Appl. No.: 11/171,404

(22) Filed: Jul. 1, 2005

(65) Prior Publication Data

US 2006/0001343 A1   Jan. 5, 2006

(30) Foreign Application Priority Data

Jul. 2, 2004   (DE)   .................. 10 2004 032 406

(51) Int. Cl.
*H01J 5/48*   (2006.01)

(52) U.S. Cl. ..................................... 313/113; 313/635
(58) Field of Classification Search ........ 313/110–114, 313/635; 362/297, 260, 263, 346
See application file for complete search history.

(56) References Cited

U.S. PATENT DOCUMENTS 5,902,033 A   5/1999   Levis et al.
6,727,650 B2   4/2004   Klinkenberg et al.

FOREIGN PATENT DOCUMENTS

EP   1 220 294   7/2002

*Primary Examiner*—Joseph L. Williams
(74) *Attorney, Agent, or Firm*—William E. Meyer

(57) ABSTRACT

The invention relates to a method for designing a discharge lamp for use with a light-gathering system, in particular of a projector for data or video projection. Also disclosed are a lamp designed using such a method and a reflector provided therefore.

4 Claims, 4 Drawing Sheets

METHOD FOR DESIGNING A DISCHARGE LAMP

TECHNICAL FIELD

The invention relates to a method for designing a discharge lamp that is provided for use with a light-gathering system, in particular in a projector for data or video projection, having a burner that has a discharge vessel accommodating electrodes, and which is inserted into an elliptical reflector, the geometry of the ellipsoid being determined, inter alia, by two focal points, by a numerical eccentricity and by two ellipse semiaxes, and the light-gathering system. The invention relates as well to a lamp designed using such a method and to a reflector designed using such a method.

BACKGROUND ART

The market for digital projectors for data or video projection has been growing strongly worldwide since the invention of DLP technology. This increasing expansion is also based, inter alia, on the fact that the projectors can be produced at ever more favorable prices because of the technologies used, and can be designed with such compact dimensions that they are capable of mobile use in normal office activity.

The optical system (light engine) of digital projectors usually has a microdisplay panel that in principle constitutes a chip on the surface of which controllable pixels are arranged. The panel is illuminated by the optical system of the projector, and the resulting image is projected onto the wall by means of the projection objective. Three main types of microdisplays are distinguished in principle: DMD, LCD, LCoS. The miniaturization of the projectors depends, inter alia, on the size of these microdisplay panels, and also of the light sources used. The basic design of a projector with an LCD panel is described, for example, in U.S. Pat. No. 5,902,033, while reference may be made with regard to the function of the DMD panels to the relevant patent applications of Texas Instruments, which are directed to the DLP method (digital light processing®).

The abovedescribed digital projection systems predominantly make use as light source of high-pressure discharge lamps such as are described, for example, at www.osram.com under video and projection lamps (VIP lamps). These high pressure discharge lamps have a burner that is inserted into a glass reflector. When designing such high pressure discharge lamps, it must be borne in mind that neither the reflector nor the burner are thermally damaged at the very high temperatures that occur. These burners generally have a discharge chamber that is arranged approximately in the middle and merges into two burner shafts arranged diametrically relative to one another. Because of the comparatively large axial length of these burners, a portion of the output radiation is reflected onto the end section of the shaft such that the latter is exposed to a strong thermal load. It is proposed in U.S. Pat. No. 6,727,650 to provide the end section of the shaft with a reflection layer that acts as a heat insulation layer and reflects the incident radiation such that it is possible to avoid additional heating of the burner in this region. Alternatively or additionally, it is possible to feed cooling air, but the fans required for this purpose increase both the overall space of the projector and its noise emissions.

DISCLOSURE OF THE INVENTION

It is an object of the present invention to provide a method for designing a discharge lamp, a lamp designed using such a method, in particular a discharge lamp, and a reflector suitable therefore, which have a minimal overall space, a high optical efficiency and a low thermal load.

According to the invention, the reflector is designed as a function of a few parameters such as of the etendue (photoconductance) and of the acceptance angle of the light-collecting system, and of the length of a discharge arc of a discharge lamp used. It is then possible with the aid of these parameters to determine the numerical eccentricity, that is to say the shape of the elliptical reflector, an eccentricity calculated as a function of the acceptance angle being corrected with the aid of an adaptation value that is a function of the etendue and the arc length. That is to say, the reflector is adapted to the light-collecting system with the aid of this adaptation value.

According to the invention, the shape of the ellipse is therefore determined as a function of these parameters, with two of the parameters (etendue and acceptance angle) being prescribed by the optical system, while the third parameter (arc length) is prescribed by the lamp used. The maximum efficiency of the light-collecting system is then ensured independently of the size of the reflector.

The invention therefore permits the geometry of an elliptical reflector to be optimally adapted in an extremely simple way to the light-collecting system, for example a projector, as a function of a few parameters.

In order further to minimize the overall space of the system, it is possible according to the invention to select the two ellipse axes for the prescribed eccentricity so as to minimize the thermal load described at the beginning for the reflector or the lamp.

In the case of discharge lamps for projection systems, the discharge arc is arranged at the focal point $F_1$ (shorter focal length) of the elliptical reflector. According to the invention, this focal length is selected to be $\geq 8$ mm—it has emerged that this measure constitutes an optical compromise between a compact design and a minimal thermal load on the burner and the reflector. The size of the reflector is selected such that the burner is located either entirely or virtually in the aperture hole. Such an aperture hole is understood as a middle region into which the reflector does not emit because of the typical beam intensity distribution of the burner. Depending on this condition (end of burner being situated inside the aperture hole), the larger focal length in which the light beams emitted by the burner are focused by means of the elliptical reflector can be determined as a function of the length and the diameter of a burner shaft, as well as of the previously calculated eccentricity. Knowledge of this focal length can then be used to calculate the two ellipse axes by simple geometric considerations.

The overall length of the lamp can be further shortened by permitting the burner shaft to project somewhat from the aperture hole. In this case, the calculation of the larger focal length then further includes in addition to the above-described parameters the angular range by which the burner projects from the aperture hole.

The overall space required for installing the reflector is minimal when the latter is provided with flats of which in each case two are arranged at a spacing parallel to one another, the spacing between two flats preferably being smaller than the spacing between the two other flats.

The burner is preferably designed as a high-pressure discharge lamp.

BRIEF DESCRIPTION OF THE DRAWINGS

The invention is explained in more detail below with the aid of exemplary embodiments and with reference to drawings, in which.

BEST MODE FOR CARRYING OUT THE INVENTION

Figure 1:
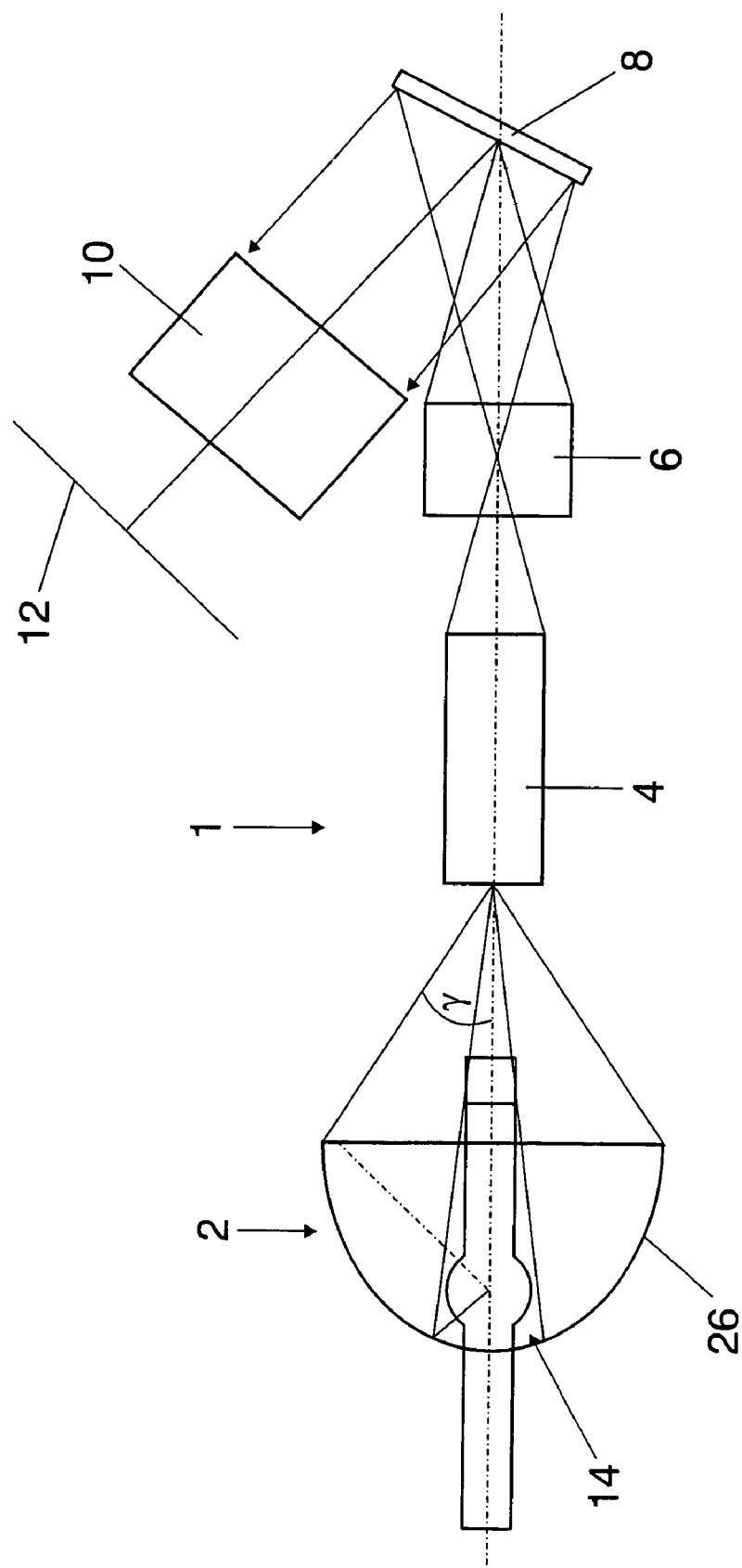
FIG. 1 shows a schematic of a projector having a high pressure discharge lamp and an optical system of the projector.

FIG. 1 shows the basic design of a DLP (Digital Light Processing) projector for video projection. The optical system of the projector 1 essentially comprises an HID lamp (High Intensity Discharge lamp) 2, an integrator 4, a relay optical system 6, a DMD chip 8 and the objective 10 via which the image is projected onto a display screen 12. The color wheel used in DIP technology and which is usually arranged between the integrator 4 and the lamp 2 is not illustrated. The components of HID lamp 2, integrator 4, relay optical system 6, DMD chip 8 and objective 10 are also denoted as light engine.

Figure 2:
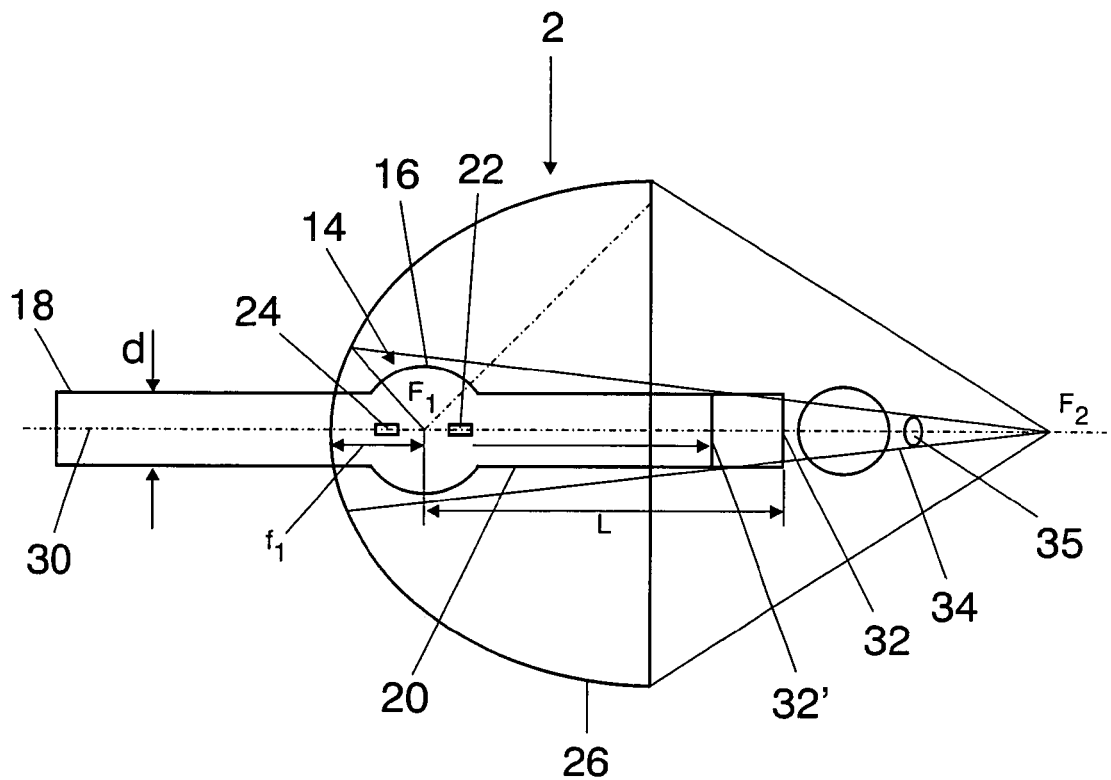
FIG. 2 shows a diagram illustrating the geometry of an elliptical reflector of the high pressure discharge lamp from FIG. 1.

FIG. 2 shows an enlarged illustration of the HID lamp 2 from FIG. 1. According to FIG. 2, the HID lamp has a burner 14 whose bulb has, approximately in the middle, a discharge vessel 16 which is adjoined by two axially projecting burner shafts 18, 20. Arranged in the discharge vessel 16 are two tungsten electrodes 22, 24 (schematically illustrated) that are arranged at a predetermined spacing from one another which determines the length g (not illustrated) of a discharge arc.

The design of such HID lamps is known, and these are described, for example, at www.osram.de under the name of VIP lamps, and so further explanations are superfluous.

The burner 14 is inserted into an elliptical, substantially rotationally symmetrical reflector 26 that is provided with a reflection layer. The discharge vessel 16 with the two electrodes 22, 24 is arranged such that the discharge arc produced lies at a focal point $F_1$ of the reflector 26. The light produced in the discharge vessel 16 by the discharge arc is imaged by the reflector 26 onto the focus $F_2$ that is situated in the input aperture of the integrator 4. Since the discharge arc is not a punctiform light source, this imaging does not take place exactly at the focus $F_2$ in punctiform fashion—although this is illustrated in FIG. 2 in an idealized way.

The light emitted by the HID lamp 2 is homogenized by multiple reflection in the integrator 4 and then imaged on the exit side via the relay optical system 6 onto the DMD chip 8. The actual image is produced via the latter. Depending on design, 600 000 swivelable micromirrors, for example, that act as a light valve are located on the DMD chip 8. Depending on mirror position, it is then possible for an image pixel to be produced or to remain dark. The light reflected by the DMD chip 8 acquires the corresponding color information from the color wheel arranged upstream thereof. Grey scales and color nuances are reproduced by a correspondingly longer or shorter reflection time. The image output by the DMD chip 8 is, finally, imaged onto the projection screen 12 via the objective 10.

When the projectors 1 are being designed, an attempt is made to construct them as compactly as possible and with high efficiency so as to enable a brilliant projection with a high level of brightness and good contrast. In this case, the light collecting system of the projector 1 with the integrator 4, the relay optical system 6 and the DMD chip 8 is generally prescribed such that the etendue (surface and acceptance angle) of the DMD chip 8 is also prescribed appropriately as a constant.

The mirrors of the DMD chip 8 of a 0.7" DMD chip 8 can usually be reflected by 12° such that the acceptance angle γ of the DMD chip is correspondingly 12°. The relay optical system 6 expands this acceptance angle such that the acceptance angle γ' of the light-collecting system is somewhere between 20° and 40°. As a rule, it is then possible only by means of a suitable design of the HID lamp 2 to perform optimization in an existing projection system.

It may now be assumed that, in the case of a given burner 14 with a specific length g of the discharge lamp and a length L (FIG. 2) of half the burner 14 (distance from midpoint of the discharge vessel 16 up to end face of the burner shaft 20) and an existing light-collecting system with the etendue E and the acceptance angle γ' that the aim is to design a reflector 26 that is designed as compactly as possible and, furthermore, minimizes the thermal load on the components of the HID lamp 2.

Design of the Elliptical Geometry of the Reflector

In a first design step, the eccentricity $e_a$ that essentially characterizes the geometry of the reflector 26 is initially determined. This is calculated according to:

$$e_a = \frac{\sqrt{2}+1-\tan\frac{\gamma'}{2}}{\sqrt{2}+1+\tan\frac{\gamma'}{2}}, \qquad \text{equation 1}$$

where γ' is the acceptance angle.

In a further step, there is calculated for the eccentricity an adaptation factor that is essentially a function of the above-named parameters of the projector 1. This adaptation factor Δe is calculated according to:

$$\Delta e = 1.3 \sin 2\gamma' \exp\left(-2\frac{E^{0.17}}{g}\right), \qquad \text{equation 2}$$

where g is the length of the discharge arc;
E is the etendue, and
γ' is the acceptance angle.

The numerical eccentricity $e_0$ is then calculated from the difference between the eccentricity $e_a$ and the adaptation factor Δe:

$$e_0 = e_a(\gamma') - \Delta e(\gamma', E, g) \qquad \text{equation 3}$$

Given a specific relay optical system 6, the result for a 0.7" DMD chip 6 with a mirror tilt angle of 12° and an etendue of E=20 mm²sr is the numerical eccentricity values $e_0$, shown in Table 1, for an acceptance angle γ' specified by the relay optical system 6.

TABLE 1

| γ' | $e_a$ | $e_o$ |
|---|---|---|
| 23° | 0.85 | 0.81 |
| 29° | 0.81 | 0.77 |
| 34° | 0.77 | 0.72 |

Consequently, the basic shape of the elliptical reflector 26 is prescribed by the design rules described above. A few thermal design criteria must be taken into account in order to minimize the reflector 26.

Designing the Size of the Reflector

As explained at the beginning, thermal problems can occur during operation of a high power burner in a very small elliptical reflector, the distance from the burner 14 to the reflector 26 being critical, in particular, since too short a distance can lead to intimate thermal contact between the burner 14 and reflector 26. To date, a thermal load has been avoided by, for example, using high quality reflectors made from glass ceramic, or by cementing the burners into a ceramic part of the reflector by means of a cement.

A further thermal problem consists in that the burner shaft 20 is so long that it projects into the emitted light cone and is heated by absorption of the light. In order to remove this problem, it has been suggested in EP 1 220 294 A1 named at the beginning to provide the end section of the burner shaft 20 with a reflection layer. The invention departs from this comparatively complicated solution and avoids the thermal load by suitable design of the reflector 26. This is explained with the aid of the schematics in FIGS. 2 to 5.

Figure 3:
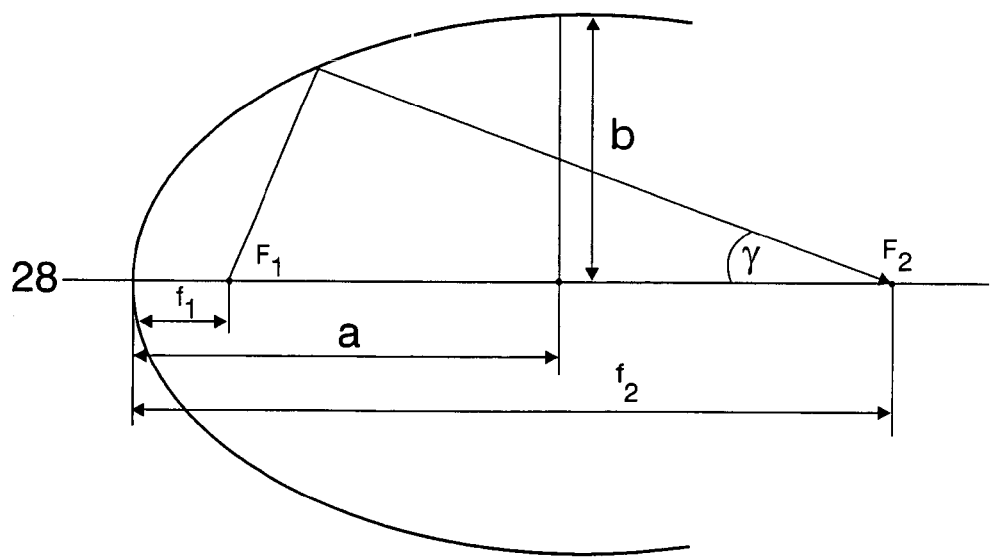
FIG. 3 shows an enlarged illustration of the high pressure discharge lamp of the FIG. 1.

FIG. 3 shows an ellipsoid according to which the reflector 26 is fabricated. This ellipsoid is characterized, inter alia, by the focal point $F_1$ and the focus $F_2$, the distance of the focal point $F_1$ from the vertex 28 defining the focal length $F_1$, while the distance of the focus $F_2$ from the vertex 28 corresponds to the focal length $F_2$. FIG. 3 also depicts the two ellipse semiaxes a (longer semiaxis) and b (shorter semiaxis). A light beam emanating from the focal point $F_1$ is reflected toward the focus $F_2$ by the ellipsoid—this light beam being incident in FIG. 3 at the angle γ' to the focus $F_2$, for example.

According to the invention, the burner 14 is arranged on the optical axis 30 of the reflector 26 in such a way that the burner shaft 20, in particular the end face 32 thereof, is arranged completely inside the aperture hole 35 that is marked by the aperture cone 34. The latter delimits that region of the burner 14 in which no imaging takes place. If the end face 32 is now inserted into this aperture cone 34, the radiation reflected by the reflector 26 does not strike the burner shaft 20, and so the latter is also not additionally heated by absorption of radiant energy.

Figure 4:
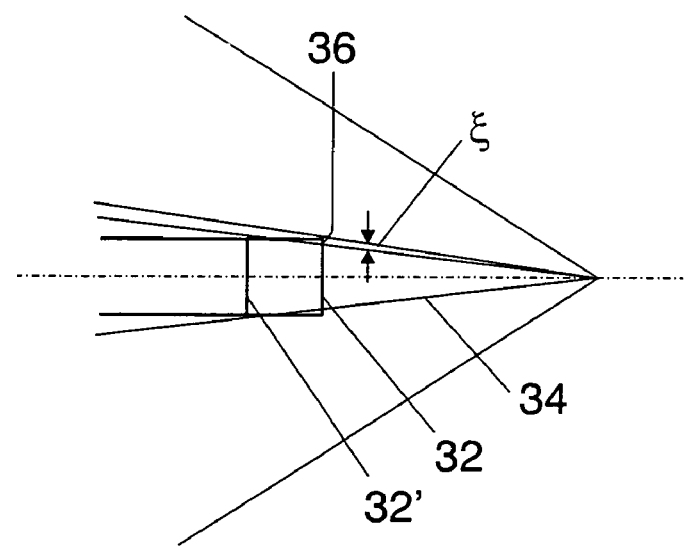
FIG. 4 shows a variant of the high pressure discharge lamp in accordance with FIG. 3.

In the exemplary embodiment illustrated in FIG. 2, the end face 32 does not lie exactly in the aperture cone 34, but projects beyond the aperture cone 34 with its outer circumferential sections 36 (see enlarged illustration in accordance with FIG. 4). In FIGS. 2 and 4, the reference numeral 32' marks that position of the end face 32 for which the latter would lie completely in the aperture cone 34—to reach this position would then require the use of a burner 14 of axially shorter design.

However, according to the invention it is possible to accept less of a projection of the circumferential sections 36—as illustrated in FIG. 4—this angular range being characterized by the angle ξ in FIG. 4 and being intended to amount to less than 2°, preferably less than 1°.

In the case when the thermal load on the burner shaft 20 is to be a minimum, the end face (as illustrated with 32') is introduced entirely into the aperture cone 34. For a given length L and diameter d of the burner shaft 20, the focal length $f_2$ is then calculated according to $$f_2 = \frac{L + \frac{d}{4}\left[\frac{\sqrt{2}+1}{m} - \frac{m}{\sqrt{2}+1}\right]}{1-m}, \quad \text{equation 4}$$

with the focal distance ratio m $$m = \frac{1-e_o}{1+e_o} = \frac{f_1}{f_2}. \quad \text{equation 5}$$

This focal length ratio m can be determined as a function of the numerical eccentricity $e_o$ calculated at the beginning.

This focal length $f_2$ is then used to calculate the larger ellipse semiaxis a according to $$a = \frac{f_2}{1+e_o}, \quad \text{equation 6}$$

and the smaller ellipse semiaxis b according to $$b = a\sqrt{1-e_o^2} \quad \text{equation 7.}$$

The focal length $f_2$ is calculated as follows according to equation 8

$$f_2 = \frac{1}{1-m}\left[L + \frac{d}{2}\frac{\left(\frac{\sqrt{2}+1}{m} - \frac{m}{\sqrt{2}+1}\right) - 2\tan\xi}{2 + \left(\frac{\sqrt{2}+1}{m} - \frac{m}{\sqrt{2}+1}\right)\tan\xi}\right], \quad \text{equation 8}$$

in the case when the burner shaft 20 is permitted to project slightly from the aperture cone 34, and thus a slight thermal loading of the burner 14 is permitted.

Equations 6 and 7 can then be used to recalculate the two semiaxes a, b of the ellipse as a function of the focal length $f_2$ and the numerical eccentricity $e_o$.

The thermal load of the burner 14 can be lowered again when the focal length $f_1$, that is to say the mean distance of the discharge vessel 16 from the vertex 28 of the ellipsoid is selected to be greater than 8 mm such that the burner and the reflector are reliably decoupled in thermal terms.

Applying the abovedescribed design criteria to a projector with a 0.7" DMD chip 8 with a 12° tilt angle (10% overfill), an acceptance angle of 30° being set by the relay optical system 6, yields the characteristic values illustrated in Table 2 as a function of the correspondingly prescribed etendue E, the acceptance angle γ', the length of the discharge arc g, the length L of the burner shaft 20, the diameter d of the burner shaft 20 and the permitted projection ε of the burner shaft 20 from the aperture cone, which characteristic values can be calculated directly with the aid of equations 1 to 8, which are of very simple structure.

TABLE 2

| Variable | Value | Unit |
|---|---|---|
| E | 22.7 | mm²sr |
| γ' | 30 | ° |
| g | 1.0 | mm |
| L | 31 | mm |
| d | 6 | mm |
| ξ | 0.48 | ° |
| $e_a$ | 0.800 | |
| Δe | 0.038 | |
| $e_o$ | 0.762 | |
| m | 0.135 | |
| $f_2$ | 64.56 | mm |
| $f_1$ | 8.74 | mm |
| a | 36.65 | mm |
| b | 23.75 | mm |

The reduction in the numerical eccentricity caused by the adaptation factor Δe leads not only to an optimal efficiency of the system, but also to an increase in the focal length ratio of m and thus, for a given focal length $f_2$, to a larger $f_1$ and thus to a greater distance between the discharge vessel 16 and the vertex 28 of the reflector.

Figure 5:
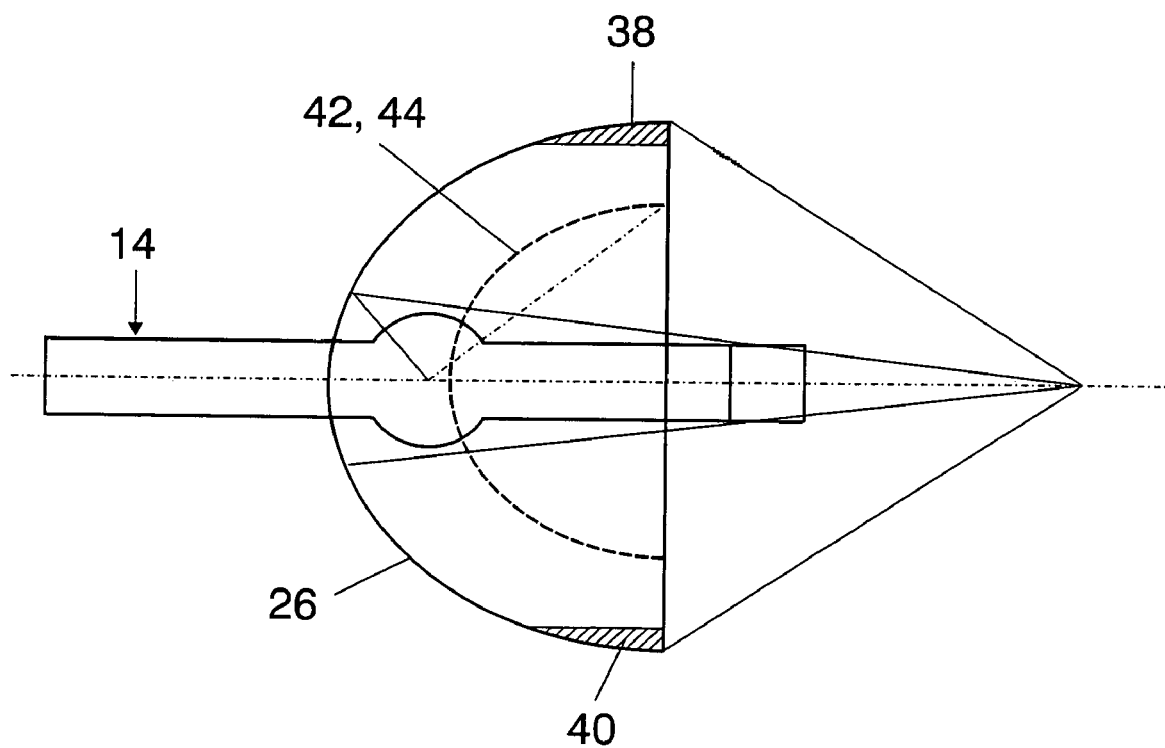
FIG. 5 shows a further exemplary embodiment of a high pressure discharge lamp with a flattened reflector.
Figure 6:
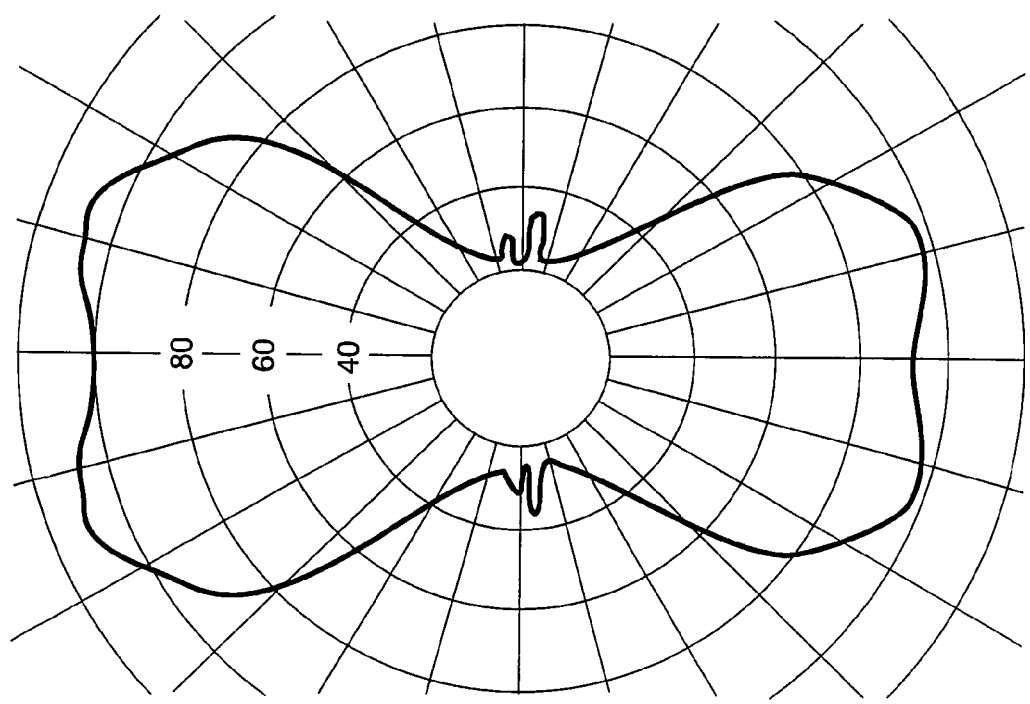
FIG. 6 shows a beam intensity distribution of a high pressure discharge lamp.

FIG. 5 illustrates a further possibility of minimizing the overall space required for the HID lamp 2. In accordance therewith, the reflector 26 is provided with flats 38, 40 and with two flats 42, 44 that are illustrated above and below the plane of the drawing in FIG. 5 and are indicated by dashes in FIG. 5. These flats are produced by "cutting away" the regions indicated by hatching in FIG. 5. In accordance with FIG. 5, at the flats 42, 44 more material has been removed from the originally circular reflector 26 than is required for the flats 38, 40. That is to say, the reflector 26 has a lesser width perpendicular to the plane of the drawing in FIG. 5 than in the plane of the drawing. The flats constitute a compromise between a smaller overall size and higher efficiency.

An HID lamp 2 was used in the case of the above-described exemplary embodiments. Of course, other discharge lamps can also be used, in principle also incandescent lamps, with regard to the design of the dimensions a, b. Again, designs, for example those named in the introduction of the description, can be used instead of the DMD chips 8 described.

The invention relates to a method for designing a discharge lamp for use with a light-collecting system, in particular of a projector for data or video projection. Also disclosed is a lamp designed using such a method, and a reflector provided therefore.

What is claimed is:

1. A projector lamp assembly comprising:
a double ended high intensity arc discharge lamp burner having an axis and a body defining a vessel with an enclosed volume and an axially aligned first electrode and second electrode each electrode having an internal tip, the first electrode tip and second electrode tip having a separation distance of g and having a midpoint axially between the tips and an axial distance from the midpoint to an end of the body of L;
an reflector having a reflective surface in the form of a portion of an ellipsoid of revolution with an eccentricity of $e_0$, a major semiaxis distance of a, a minor semiaxis of b, a first focal point $F_1$ and a second focal point $F_2$, the first focal point $F_1$ and the second focal point $F_2$ being axially aligned with the lamp with the first focal point $F_1$ being positioned at the midpoint of the lamp;
and an optical transmission structure having an optical input positioned relative to the reflector to locate the input at the second focal point $F_2$, the optical transmission structure having an etendue of E and an acceptance angle of γ'; wherein $$e_0 = e_a(\gamma') - \Delta e(\gamma', E, g) \quad \text{equation 3}$$

$$e_a = \frac{\sqrt{2} + 1 - \tan\frac{\gamma'}{2}}{\sqrt{2} + 1 + \tan\frac{\gamma'}{2}} \quad \text{equation 1}$$

and $$\Delta e = 1.3 \sin 2\gamma' \exp\left(-2\frac{E^{0.17}}{g}\right). \quad \text{equation 2}$$

2. The lamp assembly in claim 1, in which the axial distance from the reflector surface to the first focal point $F_1$ (focal length (f1)) is selected to be greater than 8 mm.

3. The lamp assembly in claim 1, in which the axial distance from the reflector surface to the second focal point $F_2$ (longer focal length (f2)) is determined according to $$f_2 = \frac{L + \frac{d}{4}\left[\frac{\sqrt{2}+1}{m} - \frac{m}{\sqrt{2}+1}\right]}{1-m}, \quad \text{equation 4}$$

where $$m = \frac{1-e_o}{1+e_o} = \frac{f_1}{f_2}, \quad \text{equation 5}$$

and the ellipse semiaxes (a, b) are calculated therefrom according to $$a = \frac{f_2}{1+e_o} \quad \text{equation 6}$$

$$b = a\sqrt{1-e_o^2}. \quad \text{equation 7}$$

4. The lamp assembly in claim 1, in which the axial distance from the reflector surface to the second focal point $F_2$, (longer focal length (f2)) is determined according to $$f_2 = \frac{1}{1-m}\left[L + \frac{d}{2}\frac{\left(\frac{\sqrt{2}+1}{m} - \frac{m}{\sqrt{2}+1}\right) - 2\tan\xi}{2 + \left(\frac{\sqrt{2}+1}{m} - \frac{m}{\sqrt{2}+1}\right)\tan\xi}\right], \quad \text{equation 8}$$

where $$m = \frac{1-e_o}{1+e_o} = \frac{f_1}{f_2}$$ equation 5 and $0 \leq \xi \leq 2°$ and the ellipse semiaxes (a, b) are calculated therefrom according to $$a = \frac{f_2}{1+e_o}$$ equation 6

$$b = a\sqrt{1-e_o^2}.$$ equation 7

* * * * *